United States Patent [19]

Sansone et al.

[11] Patent Number: 6,035,043
[45] Date of Patent: Mar. 7, 2000

[54] CELLULAR TELEPHONE MANIFEST SYSTEM

[75] Inventors: Ronald P Sansone, Weston; Anthony F Violante, Stratford, both of Conn.

[73] Assignee: Pitney Bowes Inc., Stamford, Conn.

[21] Appl. No.: 08/577,361

[22] Filed: Dec. 22, 1995

[51] Int. Cl.[7] .................................................. H04L 9/00
[52] U.S. Cl. .......................... 380/49; 380/24; 379/91.01
[58] Field of Search .................................. 379/59, 91.01; 380/49, 24

[56] References Cited

U.S. PATENT DOCUMENTS

| | | |
|---|---|---|
| 3,255,439 | 6/1966 | Simjian . |
| 3,428,948 | 2/1969 | Simjian . |
| 3,501,744 | 3/1970 | Simjian . |
| 3,716,698 | 2/1973 | Simjian . |
| 3,792,446 | 2/1974 | McFiggins et al. . |
| 3,890,599 | 6/1975 | Simjian . |
| 3,977,222 | 8/1976 | Luperti et al. . |
| 3,998,079 | 12/1976 | Uthenwoldt . |
| 4,097,923 | 6/1978 | Eckert, Jr. et al. . |
| 4,122,532 | 10/1978 | Dlugos et al. . |
| 4,138,735 | 2/1979 | Allocca et al. . |
| 4,218,011 | 8/1980 | Simjian . |
| 4,222,518 | 9/1980 | Simjian . |
| 4,226,360 | 10/1980 | Simjian . |
| 4,249,071 | 2/1981 | Simjian . |
| 4,258,252 | 3/1981 | Simjian . |
| 4,268,817 | 5/1981 | Simjian . |
| 4,317,028 | 2/1982 | Simjian . |
| 4,376,299 | 3/1983 | Rivest . |
| 4,436,992 | 3/1984 | Simjian . |
| 4,447,890 | 5/1984 | Simjian . |
| 4,549,308 | 10/1985 | Lo Pinto .................................. 380/49 |
| 4,787,045 | 11/1988 | Storace et al. . |
| 4,811,234 | 3/1989 | Storace . |
| 4,812,992 | 3/1989 | Storace . |
| 4,827,508 | 5/1989 | Shear . |
| 4,864,506 | 9/1989 | Storace . |
| 4,975,942 | 12/1990 | Zebryk ..................................... 379/91 |
| 4,977,594 | 12/1990 | Shear . |
| 5,010,571 | 4/1991 | Katznelson . |
| 5,050,213 | 9/1991 | Shear . |
| 5,051,564 | 9/1991 | Schmidt . |
| 5,058,025 | 10/1991 | Haines et al. . |
| 5,060,266 | 10/1991 | Dent ........................................ 380/49 |
| 5,077,660 | 12/1991 | Haines . |
| 5,121,126 | 6/1992 | Clagett .................................... 379/59 |
| 5,136,648 | 8/1992 | Olson et al. . |
| 5,220,593 | 6/1993 | Zicker et al. ............................ 379/59 |
| 5,224,046 | 6/1993 | Kim et al. . |
| 5,233,531 | 8/1993 | Schulz . |
| 5,233,642 | 8/1993 | Renton ..................................... 379/59 |
| 5,237,506 | 8/1993 | Horbal et al. . |
| 5,237,612 | 8/1993 | Raith ....................................... 380/49 |
| 5,239,294 | 8/1993 | Flanders et al. . |
| 5,243,654 | 9/1993 | Hunter . |
| 5,247,575 | 9/1993 | Sprague et al. . |
| 5,282,250 | 1/1994 | Dent et al. . |
| 5,291,543 | 3/1994 | Freese et al. . |
| 5,301,223 | 4/1994 | Amadon et al. . |
| 5,301,234 | 4/1994 | Mazziotto et al. . |
| 5,309,363 | 5/1994 | Graves et al. . |
| 5,309,501 | 5/1994 | Kozik et al. . |
| 5,319,705 | 6/1994 | Halter et al. . |
| 5,325,418 | 6/1994 | McGregor et al. . |
| 5,329,573 | 7/1994 | Chang et al. . |
| 5,335,278 | 8/1994 | Matchett et al. . |
| 5,345,595 | 9/1994 | Johnson et al. ......................... 379/60 |
| 5,369,401 | 11/1994 | Haines . |
| 5,377,264 | 12/1994 | Lee et al. . |
| 5,377,267 | 12/1994 | Suzuki et al. . |
| 5,377,268 | 12/1994 | Hunter . |
| 5,394,469 | 2/1995 | Nagel et al. . |
| 5,457,737 | 10/1995 | Wen ......................................... 379/59 |
| 5,579,375 | 11/1996 | Ginter ...................................... 379/59 |
| 5,625,669 | 4/1997 | McGregor et al. ...................... 379/91 |

*Primary Examiner*—Salvatore Cangialosi
*Attorney, Agent, or Firm*—Ronald Reichman; Melvin J. Scolnick; Robert Meyer

[57] ABSTRACT

This invention relates to a cellular telecommunications systems that records in the cellular telephone all the telephone calls made by that particular cellular telephone. This enables the owner or agent of the cellular telephone to compare the telephone calls made by his cellular telephone with the telephone calls that were charged to his assigned number.

13 Claims, 7 Drawing Sheets

CELLULAR TELEPHONE MANIFEST SYSTEM

CROSS REFERENCE TO RELATED APPLICATIONS

Reference is made to commonly assigned copending patent application Ser. No. 08/577,789 filed herewith entitled "Authorized Cellular Telephone Communication Access And Verification Control System" in the names of Anthony F. Violante and Ronald P. Sansone, pending Ser. No. 08/577,312 filed herewith entitled "Authorized Cellular Telephone Communication Payment Refill System" in the names of Anthony F. Violante and Ronald P. Sansone, pending Ser. No. 08/577,567, and filed herewith entitled "Authorized Cellular Voice Messaging And/Or Analog or Digital Data Communication Access And Verification Control System" in the names of Ronald P. Sansone and Anthony F. Violante, pending Ser. No. 08/575,782, filed herewith entitled "Metered Payment Cellular Telephone Communication System" in the names of Gary G. Hansen, David W. Riley, David K. Lee, Frederick W. Ryan, Jr. Nathan Rosenberg, Anthony F. Violante and Ronald P. Sansone, pending Ser. No. 08/577,683, and filed herewith entitled "A Method For Communicating With A Voice Response Unit Over A Cellular Telephone Network" in the names of Steve Kovlakas, Steven Vasquez, Jean-Hiram Coffy and Michael Wilson, pending.

FIELD OF THE INVENTION

The invention relates generally to the field of telecommunications systems and more particularly to cellular telecommunications manifest systems.

BACKGROUND OF THE INVENTION

Cellular mobile radio or cellular telephone systems have been developed for mobile communications. Typically, the planned service area is divided into a number of geographical areas or cells. The available frequency channels for the service area are divided among the cells. A cellular telephone communicates with a nearby cell base station via one of the several radio frequency channels assigned to the cell. Conventional circuits link the base station to the mobile telecommunications switching office, which switches calls between the cellular telephone system and the rest of the telephone network.

Current cellular telephones gain access to the base station, by transmitting to the base station a series of numbers or characters, specific to the cellular telephone being used. The numbers or characters represent the telephone number of the cellular telephone being used and the manufactures identification number of the cellular telephone being used. The foregoing characters and numbers are checked at the base station to determine if the cellular telephone being used is allowed to use the base station selected and that the telephone number of the cellular telephone being used has the correct manufactures identification number. If the telephone number and manufactures identification number are found to be correct, the base station may further determine if the time elapsed and distance traveled by the cellular telephone from the last cellular telephone call are feasible. If, the cellular telephone traveled a feasible distance in the time elapsed from the last telephone call, the cellular telephone will be connected to the telephone network.

Unfortunately, people using off the shelf electronic receiving equipment are able to intercept and determine the telephone number and manufactures identification number of cellular telephones, while the telephone number and manufactures identification are being transmitted at specific radio frequencies to the base station. During, 1993 United States Cellular Telephone companies lost approximately three hundred ninety four million dollars ($394,000,000.00) from the unauthorized use of cellular telephone numbers and manufacturers identification numbers. It was estimated that the unauthorized use of cellular telephones will cost United States Cellular telephone companies six hundred million dollars ($600,000,000.00) during 1994. The expected increase in cellular telephone usage is likely to cause the above figure to be higher each successive year.

Cellular telephone companies currently record and collate telephone calls by telephone numbers. The telephone companies then charge the person or entity that was assigned the telephone number for all telephone calls made using the assigned number. The person or entity who was assigned a particular telephone number may or may not have made all of the telephone calls that were recorded for the assigned telephone number. Currently, there is no record that is stored in a cellular telephone that lists all the telephone calls made by that particular cellular telephone.

SUMMARY OF THE INVENTION

This invention overcomes the disadvantages of the prior art by providing a cellular telecommunications system that records in the cellular telephone all the telephone calls made by that particular cellular telephone. This enables the owner or agent of the cellular telephone to compare the telephone calls made by his cellular telephone with the telephone calls that were charged to his assigned number and appear in his telephone statement. If, there is a disagreement between the list of telephone calls contained in the cellular telephone and the list of telephone calls appearing in the statement, the owner or agent of the cellular telephone, may bring this fact to the attention of the carrier company so that there will be no charge for unauthorized usage of the telephone.

DETAILED DESCRIPTION OF THE PREFERRED EMBODIMENT

Figure 1:
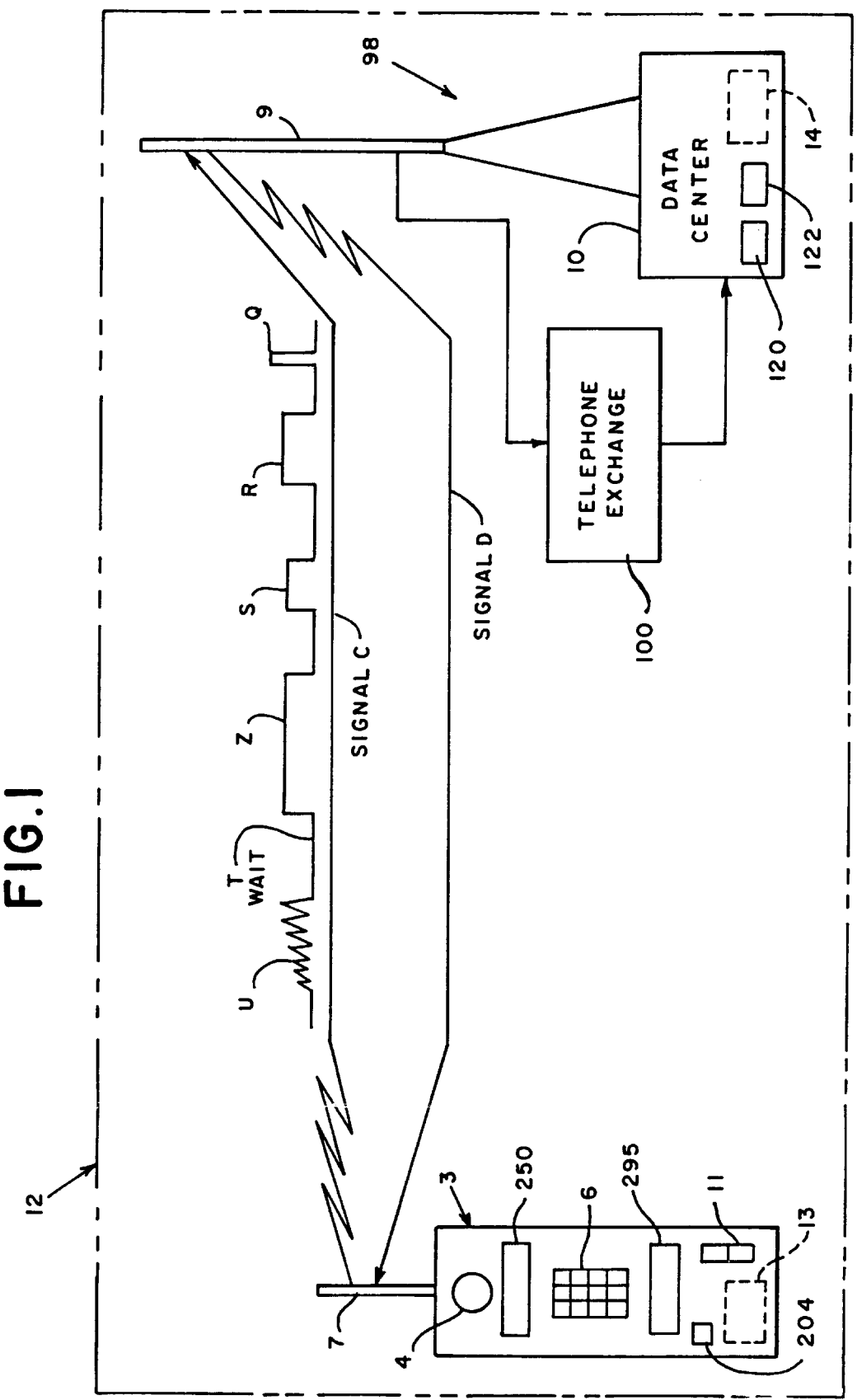
FIG. 1 is a drawing of the cellular telecommunications network of this invention.

Referring now to the drawings in detail, and more particularly to FIG. 1 the reference character 12 represents the cellular telecommunications network 12 of this invention. Network 12 includes: a cellular telephone 3, that has a speaker 4, a mouthpiece 5, a keypad 6, an antenna 7, a power switch 11, a keypad 204, a display 295 (that displays the manifest e.g. the phone calls made by cellular telephone 3), a LED display 250 (that indicates the amount of units or funds that may be made with cellular telephone 3), a liquid crystal display 295 that displays the contents of manifest register 299 (FIG. 2) and a device 13 for encrypting component Z of Signal C (device 13 will be hereinafter described in the description of FIG. 2); a base station 98, that includes an antenna 9 and a data center 10 that includes a decryption device 14 (device 14 will be hereinafter described in the description of FIG. 3); and a telephone exchange 100.

When someone would want to place a telephone call on telecommunications network 12, they would activate power switch 11 and enter the telephone number they wish to call on keypad 6. Cellular telephone 3 will transmit Signal C via antenna 7. Signal C has six components: Q; R; S; Z; T; and U. Component Q contains handshake information to make cellar telephone 3 compatible with base station 98 and component R contains the manufactures identification number for cellular telephone 3. Component S contains the telephone number of cellular telephone 3 and component Z contains an encrypted message that changes from transmission to transmission. Component Z will be more fully described in the description of FIGS. 3 and 4. Component T is a delay and component U is the phone number entered into keypad 6. Signal C is received by antenna 9 and processed by data center 10. The foregoing transmitted characters and numbers are checked at base station 98 to determine if cellular telephone 3 is allowed to use the base station selected and that the telephone number of the cellular telephone being used has the correct manufactures identification number. If Signal A contains the correct information about cellular telephone 3 i.e., the telephone number and manufactures identification number are found to be correct, the base station 98 further determines if the time elapsed and distance traveled by cellular telephone 3 from the last cellular telephone call are feasible. If, cellular telephone 3 traveled a feasible distance in the time elapsed from the last telephone call, device 14 reads component Q. If component Q contains the correct information, base station 98 transmit Signal D to antenna 7 and connects cellular telephone 3 to telephone communications network 12, via telephone exchange 100.

Signal C is transmitted over specified radio frequencies and always contains different information, component Z will always have different information. Hence, even if Signal C is intercepted by conventional off the shelf electronic receiving equipment. Signal C would not be able to be used by a thief to make another unauthorized cellular telephone calls.

Figure 2:
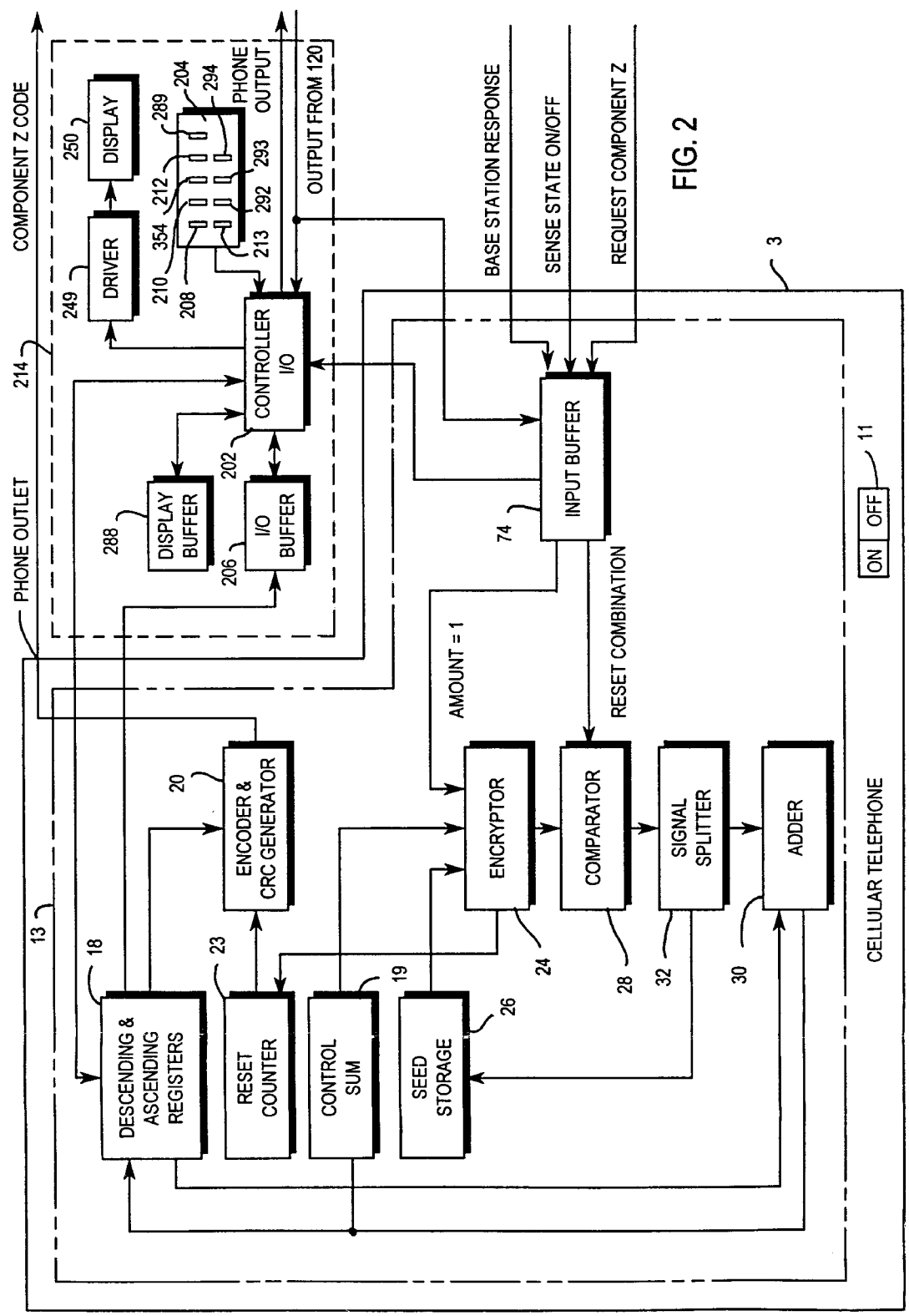
FIGS. 2 and 2A are block drawings of the cellular phone portion of the apparatus of this invention.

FIG. 2 is a block drawing of the cellular phone portion of the apparatus of this invention. Decryption device 14 includes: descending and ascending registers 18; reset counter 23; control sum 19; seed storage 26; encoder and cyclical redundancy character generator 20; encryptor 24; comparator 28; signal splitter 32; adder 30; and input buffer 74.

Register 18 contains an ascending and descending register. Register 18 is coupled to an encoder and cyclical redundancy character generator 20 as is reset counter 23. Encoder and cyclical redundancy character generator 20 operates upon the information from register 18 and from the reset counter 23 to generate an authorization code (component Z of Signal C). Component Z is sent to the output of cellular phone 3 and transmitted to base station 98. How are components Q, R, S, T and U are buffered and sent to base station 98 by the currently used cellular telephone processes known to those skilled in the art.

The authorization code is utilized in conjunction with the remote resetting of device 14 in communication with base station 98 (shown in FIG. 3), the base station 98 may be accessed by device 14 over an insecure radio frequency.

The authorization code provides a level assurance that information has been accurately transferred between user of cellular telephone 3 and base station 98. Encoder and cyclical redundancy character generator 20 are of the type which process information to provide a detection scheme for errors which may occur in transferring information.

When power switch 11 of cellular phone 3 is turned on, a amount equal to one (1) is entered by cellular phone 3 at input buffer 74. The amount is applied to an encryptor 24. Additionally, applied to the encryptor 24 is information from the control sum register 19, and a presorted seed number signal from seed storage 26. The seed number signal is stored in an unencrypted form. Encryptor 24 can be any one of a large number of encrypting devices including those devices which use the Data Encryption Standards described in FIPS PUB 46, dated Jan. 15, 1977 and published by the United States Department Of Commerce, National Bureau of Standards, herein incorporated by reference. In addition, a standard encryption scheme, such as the RSA encryption technique, can also be used for encryptor 24. It will be obvious to one skilled in the art that different public and private encryption keys may be utilized. Encryptor 24 generates an encrypted signal based upon the amount equal to one (1) received from input buffer 74, the information from control sum register 19 and the seed number signal from seed storage register 26. The output signal of encryptor 24 is applied to a comparator 28. Comparator 28 compares the signal generated by encryptor 24 with a signal received from base station 98 via input buffer 74.

If comparator 28 determines that the entered combination coincides with the combination generated by encryptor 24, comparator 28 generates a signal to signal splitter 32. Signal splitter 32 transmits a signal to seed storage 26 and adder 30. Seed storage 26 would typically store numbers having from 6 to 128 digits. It would be obvious to one skilled in the art that additional digits may be utilized by seed storage 26. The output of adder 30 is applied to increment the descending register in descending and ascending registers 18 and increment control sum 19. A successful comparison by comparator 28 also causes a new seed number to be stored in seed storage 26 for the next phone call. Seed storage 26 will transmit the new seed number to encryptor 24 for the next phone call.

Reset counter 23 is incremented by the output of comparator 28 only when comparator 28 has a successful comparison. Reset counter 23 may be one of many types including a modulo 2 or modulo 16 counter. Counter 23 provides an input signal to encoder and cyclical redundancy character generator 20 such that the authorization code signal (component Z of Signal C) contains information as to whether device 14 has been successfully reset.

Refill device 214 is utilized for the addition of funds or units to cellular telephone 3 or to request a manifest from cellular telephone 3. Device 214 includes: a keyboard 204, that has buttons 208, 210, 212, 213, 289, 292, 293, 294 and 354; a controller 202 that is coupled to the output of keypad 204, the input and output of display buffer 288 and one of the outputs of input buffer 74; and an input/output buffer 206. Button 208 is used to enter the contents of ascending register 18 into controller 202 and button 210 is used to enter the contents of descending register 18 into controller 202. Button 212 is used to enter the access code number into controller 202 and button 213 is used to acknowledge receipt of the new access control number. Button 289 is used to enter the date and time. Button 292 is used to request a manifest and button 354 is used to request a refill. Line step up button 293 is used to step to the next line of values contained in manifest register 299 and line step down button 294 is used to step to the previous line of values contained in manifest register 299. The operation of buttons 289, 292, 293, and 294 will be more fully described in the description of FIG. 5. The fourth input to input buffer 74 is the register request line that is coupled to the output of computer 120. The aforementioned register request signal is buffered by buffer 74 and coupled to one of the inputs of controller 202. One of the outputs of controller 202 is coupled to the input of input/output buffer 206 and one of the other outputs of controller 202 is coupled to one of the inputs of descending and ascending registers 18. One of the outputs of descending and ascending registers 18 is coupled to the input of input/output buffer 206. The other output of controller 202 is coupled to the output of cellular telephone 3. One of the outputs of controller 202 is connected to the output of driver 249 and the output of driver 249 is connected to the input of display 250. Display 250 displays the value of the phone calls remaining in cellular telephone 3 in dollars, call units or any other convenient value. In other words display 250 displays the value currently in descending register 18. Thus, the owner of cellular telephone 3 may look at display 250 and determine if it is time to request a refill of funds or units or check the calls stored in manifest register 299.

Figure 2A:
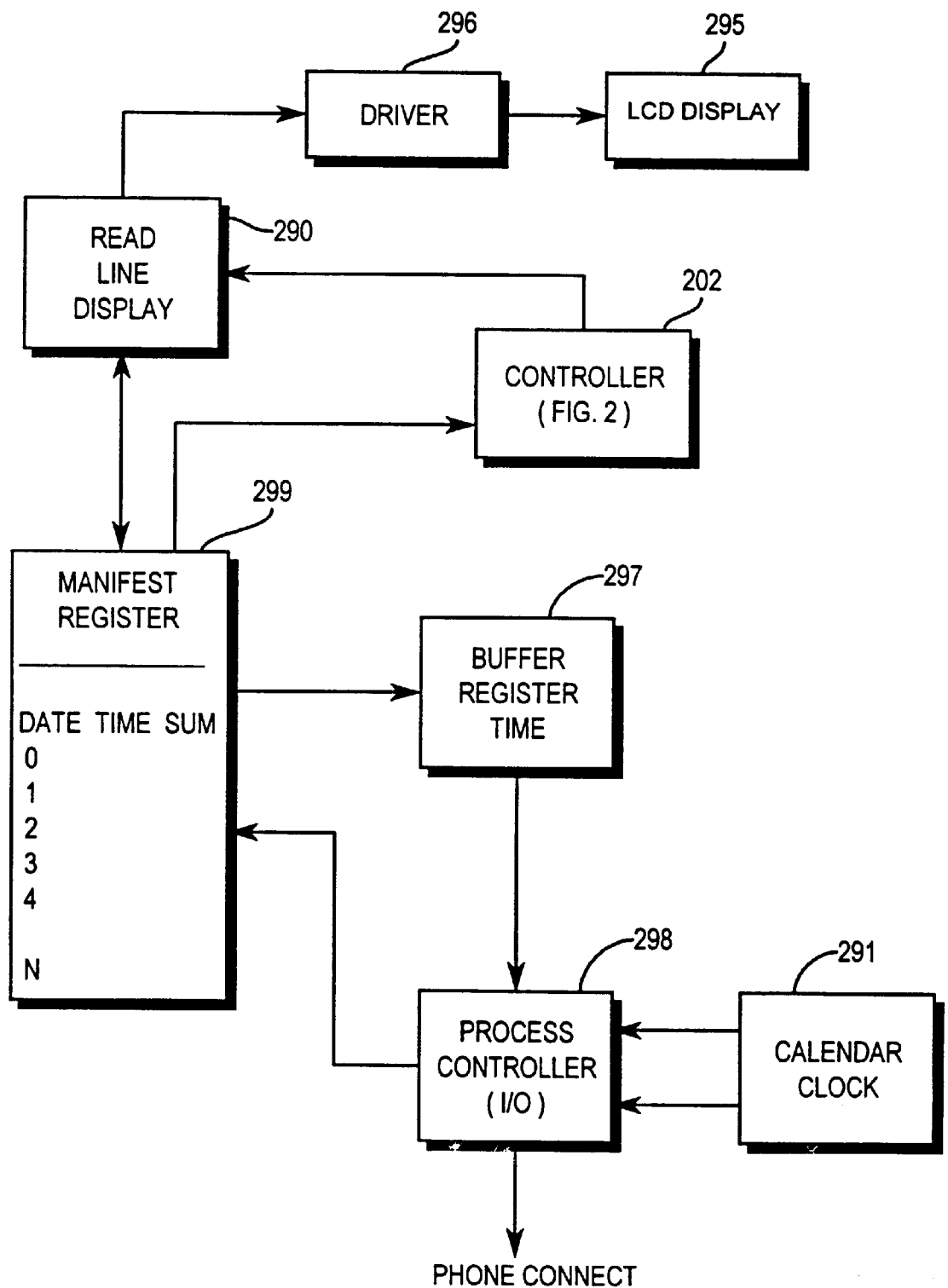

FIG. 2A is a block diagram of the manifest portion of the invention that is contained in cellular telephone 3. Manifest register 299 is coupled to the input and output of read line display 290. The output of read line display 290 is coupled to the input of driver 296 and the output of driver 296 is coupled to display 295. Calendar clock 291 is coupled to the input of processor controller 298. The output of buffer time register 297 is coupled to the input of process controller 298. The output of processor controller 298 is also coupled to one of the inputs of manifest register 299. Another output of manifest register 299 is coupled to one of the inputs of controller 202 (FIG. 2). One of the outputs of controller 202 is also connected to one of the inputs of read line display 290.

Manifest register 299 has a nonvolatile memory and contains a listing of all the telephone calls made by cellular telephone 3. The listing of telephone calls may be listed under the date, the time the call began and the time the call terminated together with the sum of the time called or the duration of the telephone call. It will be obvious to one skilled in the art that other parameters pertaining to the calls made by cellular telephone 3 may also be stored in register 299.

Figure 3:
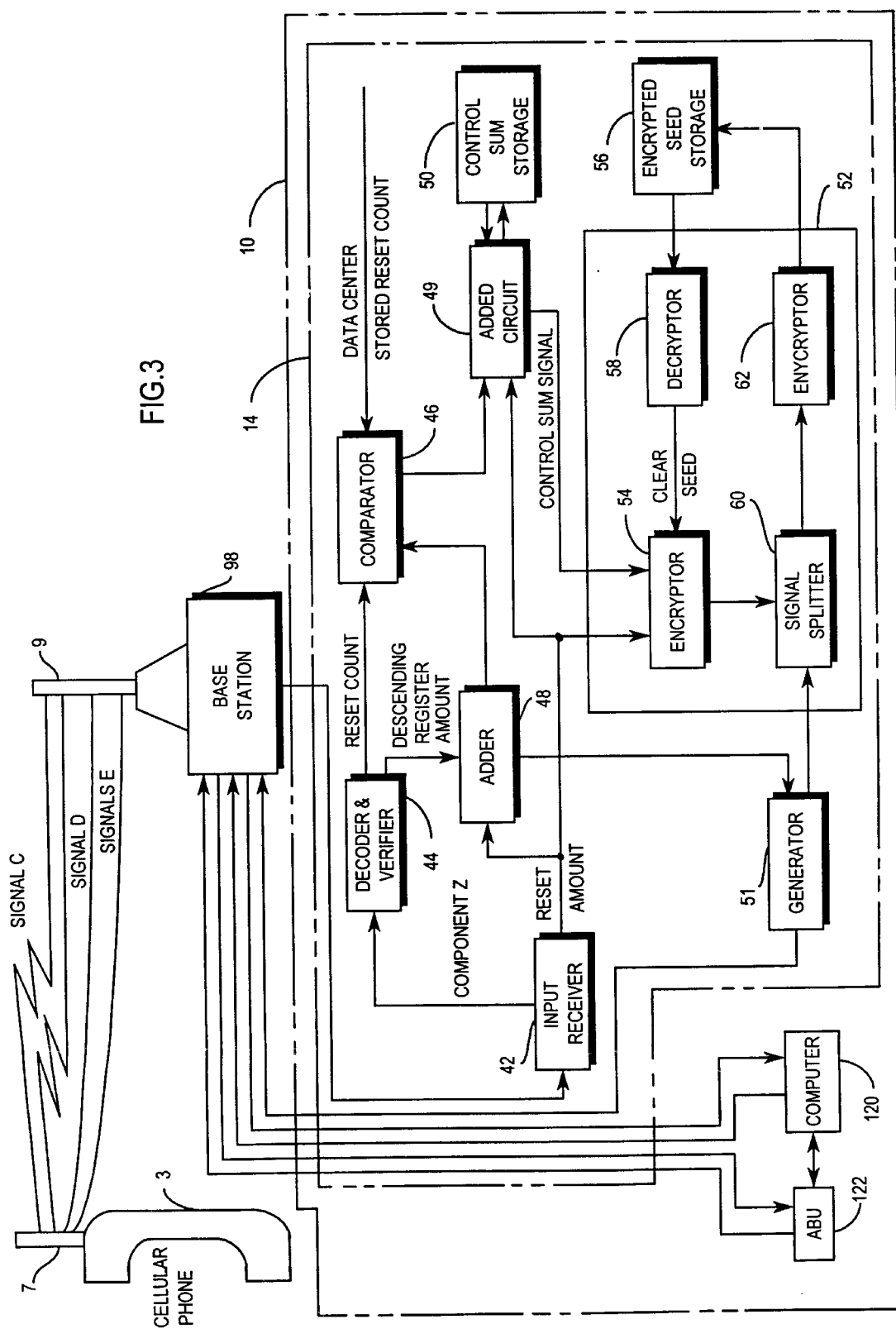
FIG. 3 is a block drawing of the cellular base station portion of the apparatus of this invention.

FIG. 3 is a block drawing of the cellular base station 98 portion of the apparatus of this invention receiving a phone call from cellular phone 3 via antenna 7. Antenna 7 transmits Signal C (shown in FIG. 2) to antenna 9 of base station 98. Device 14 is in data center 10. Device 14 receives and process component Z of Signal C from base station 98. Component Z of Signal C is received by an input receiver 42 and coupled to a decode and verify 44.

Decode and verify 44 decodes component Z of Signal C to generate the reset count and the descending register amount. Decoder 44 further verifies the cyclical redundancy characters to insure that the data has been accurately transmitted. The reset count signal is applied to comparator 46 wherein the decoded reset count signal is compared to the reset count signal stored in decoder and verifier 44. The decoded descending register amount signal is applied to an adder 49 with the reset amount signal from receiver 42. The output of adder 48 is coupled to comparator 46. If the reset count signal from decode and verifier 44 compares correctly with the output of adder 49, comparator 46 enables an adder circuit 49. Adder circuit 49 is coupled to control sum storage register 50 to provide the current control sum.

The physically sealed unit 52 is sealed in a manner to prevent access to the circuitry by base station 98 or data center 10 personnel. The sealed unit 52 results in enhanced security for the validation of component Z of Signal C because the base station and data center personnel do not have access to the encryption circuit and certain unencrypted data associated with the resetting of cellular phone 3.

The control sum signal from adder 49 is applied to an encryptor 54 within sealed unit 52 as is the reset amount from input receiver 42. Additionally applied to encryptor 54 are unencrypted seed number signals. The encryptor 54 may be any one of a large number of encrypting devices such as those employing the data encryption standard previously identified. However, it should be noted that encryptor 54 is identical in its operation to encryptor 24 contained within cellular phone 3.

The seed number signal applied to encryptor 54 is stored in data center 10 so that it may be accessible by data center personnel. However, the seed number signal is stored in an encrypted form in encrypted seed storage 56. This is the only form of the seed signal to which data center personnel have access. The encrypted seed signal from encrypted seed storage 56 is applied to decryptor 58. Decryptor 58 need not be similar to or compatible with the form of encryption provided by encryptor 54 and encryptor 24 (FIG. 3) in cellular phone 3. Decryption device 58 may be any one of the large number of devices available to decrypt the encrypted seed number signal and to provide an unencrypted, clear seed number signal which is the same as the seed number signal stored in seed storage 26 (FIG. 3) of cellular phone 3. Encryptor 54 generates an encrypted output signal which is applied to signal splitter 60. Signal splitter 60 splits the encrypted output signal from encryptor 54 into a first signal which is transmitted via generator 51 to base station 98. Antenna 9 of base station 98 transmits the above first signal as Signal D to input buffer 74 (FIG. 3) of cellular phone 3.

Splitter 60 additionally applies part of the encrypted output signal from encryptor 54 to encryptor 62 to generate a new encrypted seed number signal. Encryptor 62 encrypts the seed number signal in a manner so that it is compatible with the decryptor 58. The new encrypted seed number signal is transmitted from within the sealed unit 52 to the encrypted seed storage 56 which is accessible to the data center personnel.

The output of generator 51 is also connected to one of the inputs of computer 120 and one of the outputs of computer 120 is coupled to base station 98. Another output of computer 120 is coupled to one of the inputs of voice answer back unit 122. Another input to computer 120 is one of the outputs of base station 98 and another input to voice answer back unit 122 is one of the outputs of base station 98. Computer 120 and voice answer back unit 122 communicate with cellular telephone 3 via signals E.

Figure 4:
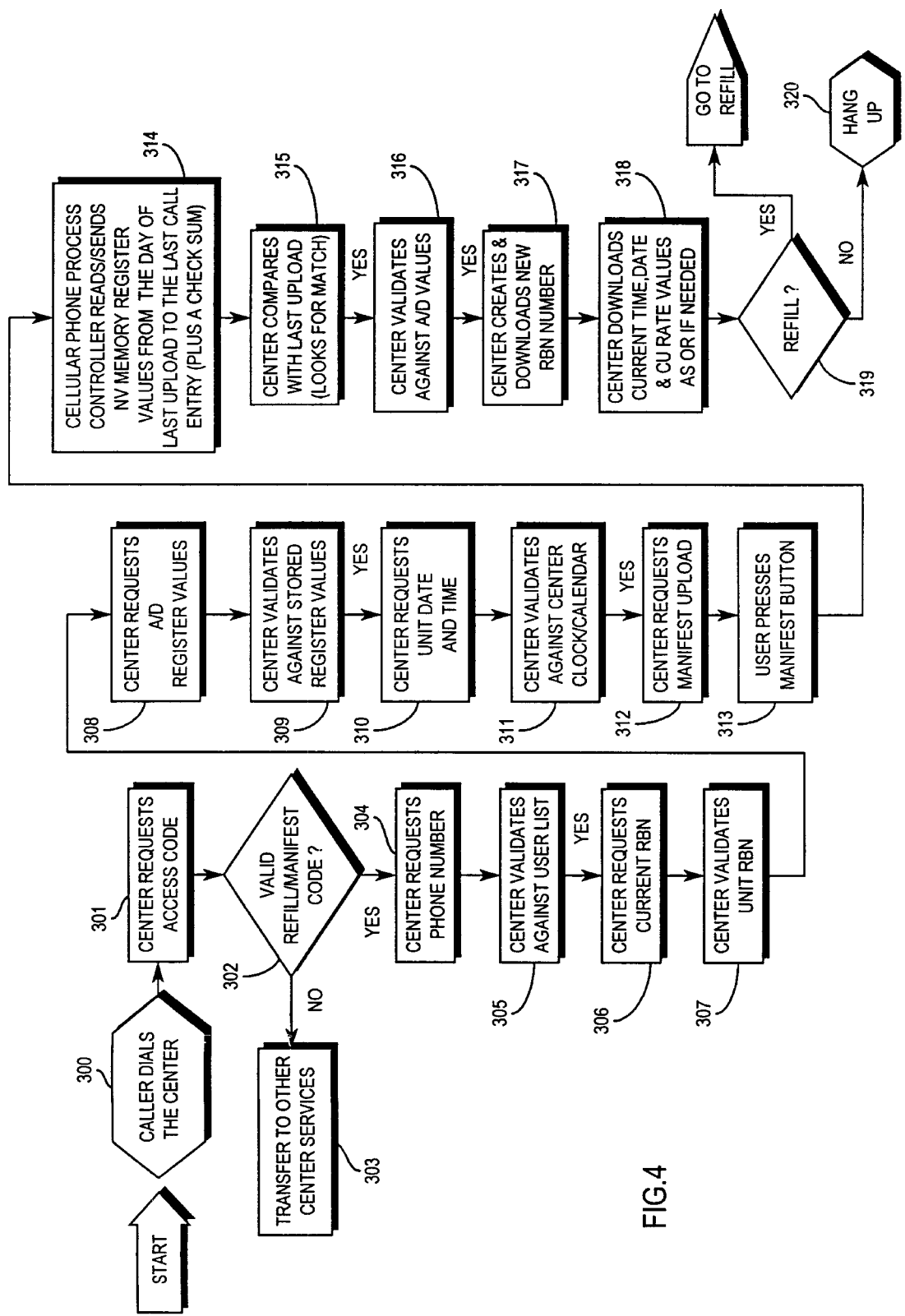
FIG. 4 is a flow chart illustrating the process flow to upload a stored cellular telephone manifest.

FIG. 4 is a flow chart illustrating the process flow to upload a stored cellular telephone manifest. When a caller determines that cellular telephone 3 needs recharging, has no money, or wants a manifest, the caller keys in the telephone number of data center 10 on telephone 3 at block 300. The data center 10 answers. After data center 10 verifies that component Z of signal C, hereinbefore described in the description of FIGS. 1–3 is authentic, micro-computer 120 located in data center 10 controls answer back unit 122 (FIG. 1) to compose a voice response as indicated by center requests access code number 301 for transmission back to the caller requesting a numeric input uniquely identifying the caller or uniquely identifying cellular telephone 3. It will be obvious to one skilled in the art, that if one is willing to have less security than that obtained above, a manifest may be obtained without encrypting and decrypting component Z. In the event it is determined not to encrypt and decrypt component Z, answer back unit 122 (FIG. 1) will compose a voice response as indicated by center requests access code number 301 for transmission back to the caller requesting a numeric input uniquely identifying the caller or uniquely identifying cellular telephone 3.

This numeric input request may be for an access code number, or the like which is also held in computer memory. Micro-computer 120 then converts to an input mode, awaiting receipt of a predetermined number of digits, representing for example the callers access code number. The cellular telephone caller then keys in the access code number using the numeric keys on the touch tone cellular telephone 3 or initiates a process within telephone 3 (by pressing button 212 on keypad 204) to generate equivalent tones. Computer 120 then searches its memory to determine if the received access code number is stored therein. If computer 120 locates a comparable access code number in its memory, meaning that the received access code number is valid, the program exits block 301, to have data center 10 request a refill code (button 354) or manifest code (button 292). If a valid refill/manifest code is not obtained, the center transfers the caller to other services in block 303. If a valid refill or manifest code is received, data center 10 requests the phone number in block 304.

Data center 10 validates the caller entered phone number with a users list that is stored in the memory of computer 120. When the entered phone number coincides with stored phone number, data center 10 requests the current refill block number (RBN). The RBN or refill block number changes each time. Data center 10 validates the RBN in block 307. After the RBN is validated the program precedes to block 308, where data center 10 request the ascending and descending register values of registers 18 (FIG. 2) block 308. The caller presses button 208 on keypad 204 in order to enter the reading in the ascending register 18 of the identified cellular telephone 3 and the caller presses button 210 on keyboard 204 (FIG. 2) to enter the reading in the descending register 18.

The program contained in computer 120, the entry of the callers ascending and descending register 18 reading and upon receipt, data center validates the aforementioned readings against the values of register 18 stored in the memory of computer 120 on the occasion of the previous charge of the user cellular telephone in block 309. Since descending register 18 is decremented by the amount of calls, amount of funds or units of calls issued with each cellular telephone cycle, the current descending register reading can not be greater than the descending register 18 reading stored in computer memory 120. If, a validation is received in block 309 the program proceeds to block 310 center requests unit date and time. At this juncture data center 10 requests and validates the entered date and time against the clock/calendar contained in the memory of computer 120. This is accomplished by having the cellular telephone user press end button 289. If, a validation is received in block 311, data center 10 requests a manifest upload in block 312. Thereupon, the caller presses a manifest button in block 313. Manifest button 292 is on keypad 204.

After manifest button 292 is pressed, the program precedes to block 314, where cellular telephone 3 processor controller 298 reads/sends the nonvolatile memory register values from the day of the last upload to the last call entry to data center 10 (plus a check sum). The nonvolatile memory values are the contents of manifest register 299, calendar 291 and ascending and descending registers 18. Data center 10 compares the just entered readings of the uploaded data with the previously entered readings of the last entered data block and looks for a match. If, a match is obtained, data center 10 creates and downloads a new RBN number in block 317. then, data center 10 downloads the current time, date and call unit rate values as or if needed in block 318. The program now proceeds to refill block 319. If a refill was requested, the program goes into the refill mode which is described in copending U.S. patent application Ser. No. 08/577,312 Docket No. E-431, entitled "Authorized Cellular Telephone Communication Payment Refill System" in the names of Anthony F. Violante and Ronald P. Sansone. If, a refill was not requested, the call is terminated in block 320.

Figure 5:
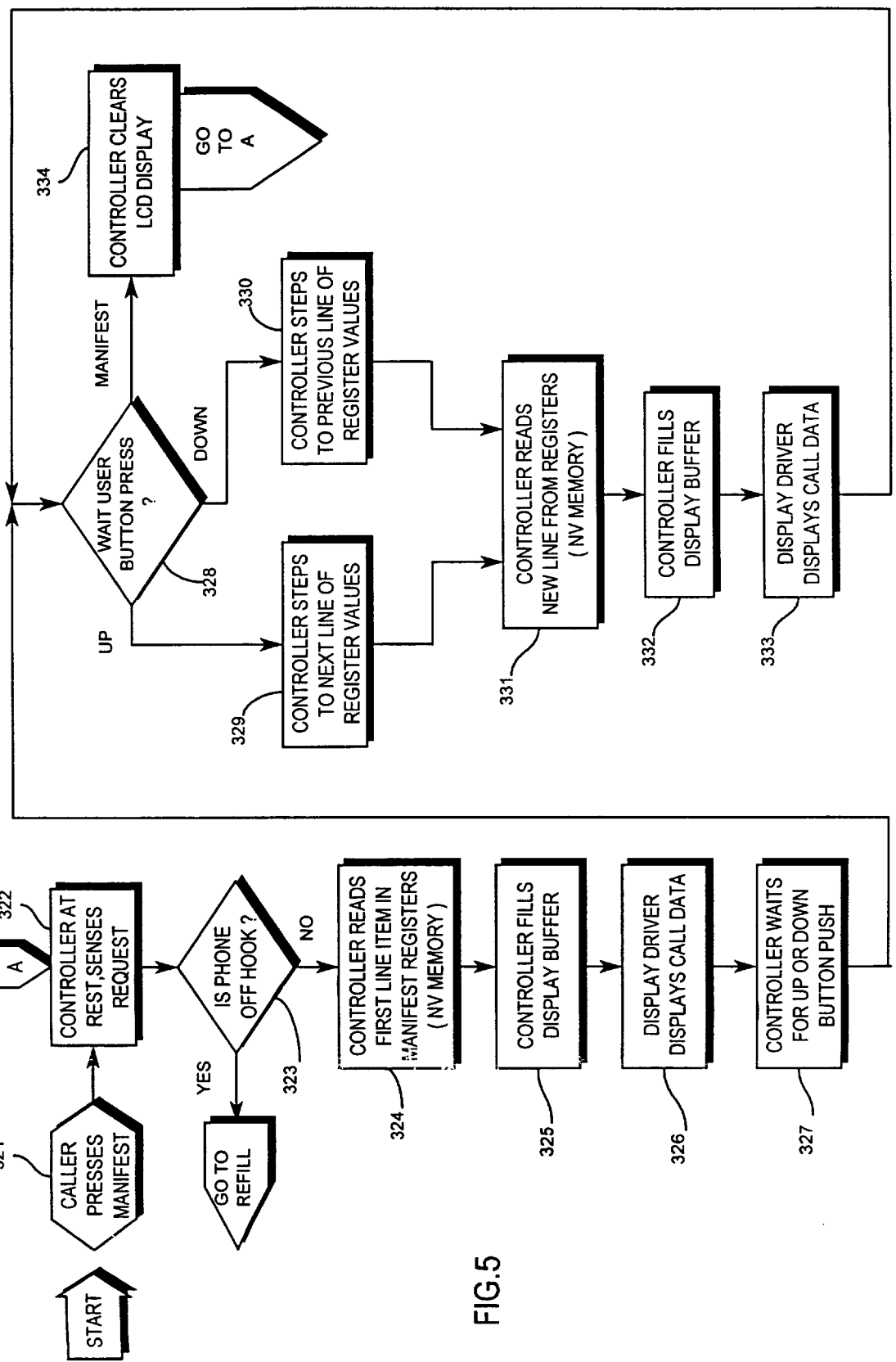
FIG. 5 is a flow chart illustrating the process flow for the caller to compare the stored manifest in cellular telephone 3 with the mailed cellular telephone statement.

FIG. 5 is a flow chart illustrating the process flow for the caller to compare the stored manifest in cellular telephone 3 with the mailed cellular telephone statement. When a manifest is desired the caller presses button 292 on keypad 204 in block 321. Controller 202 senses the above request in block 322. Block 323 determines whether or not cellular telephone 3 is off the hook. If cellular telephone 3 is off the hook, the program goes to go to refill block 324. A refill is described in copending U.S. patent application Ser. No., Docket No. E-431 "Authorized Cellular Telephone Communication Payment Refill System". In the event cellular telephone 3 is not off the hook, then and in that event the program proceeds to block 324, where controller 298 reads the first line item contained in manifest register 299. Then, in block 325 controller 298 fills display buffer 297. In block 326 driver 296 causes liquid crystal display 295 to display the first line item that was requested in block 324.

At this point controller 298 waits for the caller to press line step up button-293 or line step down button 294 in block 327. Block 328 determines whether line step (up) button 293 or line step (down) button 294 was pushed. If, line step up button 293 was pushed the program advances to block 329. In block 329, controller 298 steps to the next line of values contained in manifest register 299. If, line step down button 294 was pushed in block 328 instead of line step up button 293 the program would advance to block 330. In block 330, controller 298 steps to the previous line of values contained in manifest register 299. The next step in the program after the completion of blocks 329 or 330 is block 331. In block 331 controller 298 reads the new line selected from manifest register 299 by line step up button 293 or line step down button 294. In block 332, controller 298 fills the display buffer and in block 333 display driver 296 causes liquid crystal display 295 to display the selected information. At this time, the program goes back to block 328 to await the pressing of a button.

If, manifest button 292 was pushed in block 328, the program would go to block 334. In block 334, controller 298 clears liquid crystal display 295 and the program exits block 334 to connect the A leading to block 322.

Figure 6:
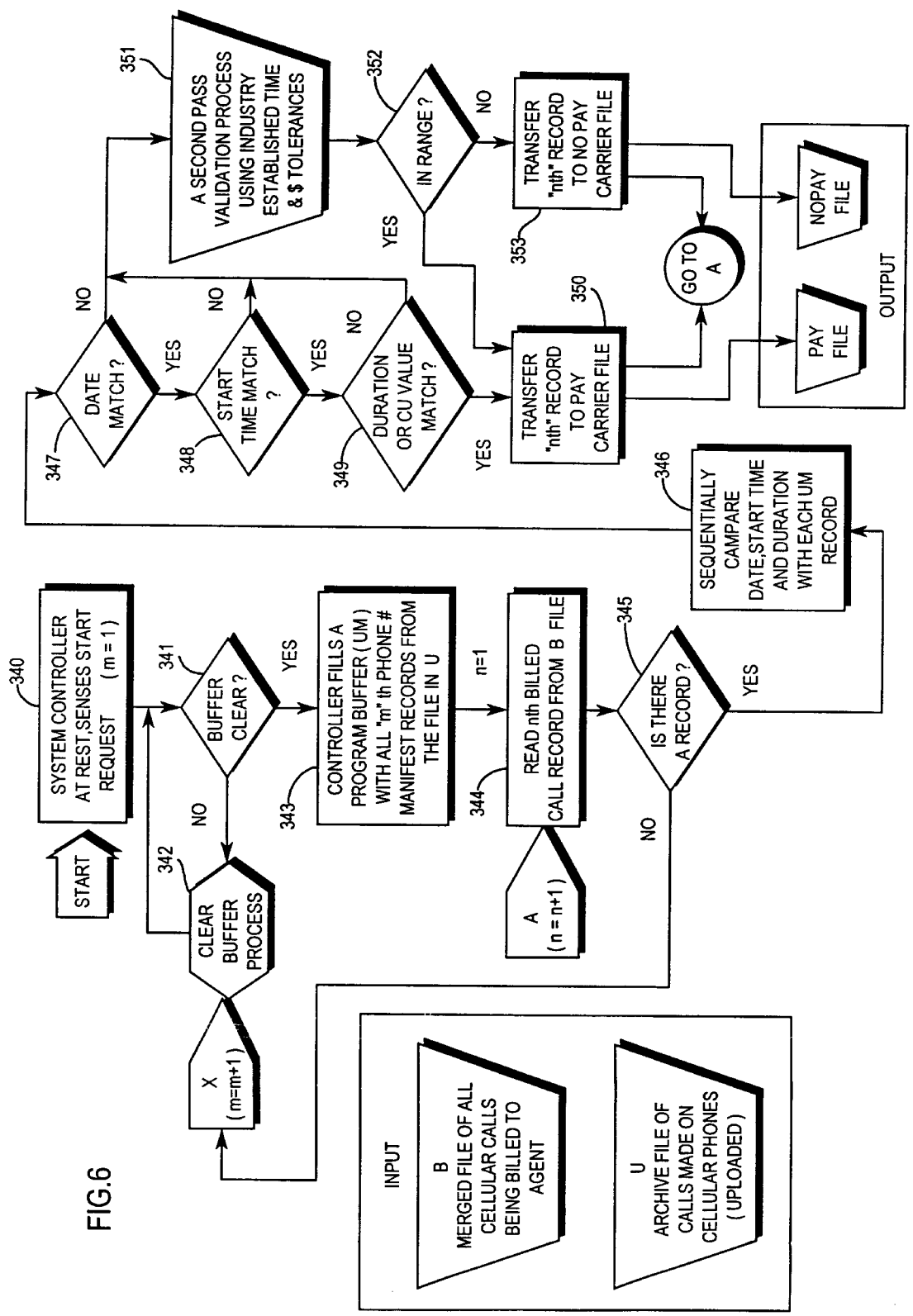
FIG. 6 is a flow chart illustrating an automatic fraudulent cellular call detecting process.

FIG. 6 is a flow chart for an automatic fraudulent cellular call detecting process. This program compares the uploaded and stored cellular telephone manifest information that has been submitted to an agent with the various cellular telephone carriers submitted bills in order to produce verified pay and no pay files. The aforementioned program resides in computer 120. The cellular phone activity of cellular telephone 3 has been uploaded and is stored in the memory of computer 120 shown on the inputs, file U. The other input to computer 120 is B the merged file of all cellular telephone calls being billed.

The program begins at the start arrow and moves to block 340. The system controller is at rest and senses the request to start. After the system controller senses the request to start, the system controller sets the value of m equal to 1. Then the program advances to block 341 to determine if the buffers are clear. If the buffers are not clear, the program goes to block 342 to clear the buffers. With clear buffers, the program passes through block 341 and goes to block 343. In block 343 the program goes to U and finds a particular phone number. All the records or manifest associated with the "m" the particular phone number are retrieved and placed in a buffer entitled UM. The variable n is also set to equal one. The program now goes to block 344 where it reads the n th. billed call record from B file. B, being the merged file of all the uploaded cellular telephone calls being billed.

At this point the program goes to block 345 and asks itself, did I get a record from B file. If the answer is yes, there is a record and the program would proceed to block 346. The program will now subsequently compare in block 347 the date, in block 348 the start time and in block 349 the duration of each call for a particular cellular telephone with each UM record. Assuming the answers in blocks 347, 348 and 349 are yes, I found this call, the "n" th record is transferred in block 350 to the pay carrier file. If, the answer in block 347, 348 or 349 is no, the program is passed off to a second pass validation process in block 351. The program validates that particular record by using industry established time and dollar tolerances. Some phone companies, resolve to a tenth of a minute, others to the nearest second. If the record falls within the range of tolerances 352, that particular record is now assigned a yes value and it also is transferred to pay carrier file 350. If the record does not fall within the range of tolerances, it is transferred to the "n" th record no pay carrier file 353. Whether or not the decision is pay or no pay, once the record has been transferred, that particular record's been processed and it's goes back to input A. Input A, once again starts all over with n equals n plus 1, and then checks if there's a record and repeats the whole process (n is a variable that allows one to index through the file and n plus one refers to the customers statement).

If, there is no n plus one file for a particular cellular telephone, the program has no more records for that phone number and has gone through the entire manifest for that customer. Block 345 would have a no answer and the program would proceed to input X, M equals M plus one. M plus 1 refers to the next customer's statement, and the program repeats itself for the next and subsequent statements. Thus, the program is able to distinguish between phone calls that have not been made by the cellular telephone and fraudulent telephone call, e.g. calls that have not been made by the particular cellular telephone.

The above specification describes a new and improved cellular telecommunications systems that records in the cellular telephone all the telephone calls made by that particular cellular telephone. This enables the owner or agent of the cellular telephone to compare the telephone calls made by his cellular telephone with the telephone calls that were charged to his assigned number. It is realized that the above description may indicate to those skilled in the art additional ways in which the principles of this invention may be used without departing from the spirit. It is, therefore, intended that this invention be limited only by the scope of the appended claims.

What is claimed is:

1. A method for checking the phone calls placed from one or more cellular telephones to other telephones via a telephone network, said method including the steps of:
   A. storing the date and time of the start of each call placed by a cellular telephone in the telephone that placed the call;
   B. storing the duration of time of the phone call placed;
   C. consecutively displaying the date and time of the start of each call placed by the cellular telephone in the telephone that placed the call;
   D. comparing the stored telephone calls to the telephone calls listed in the statement by the telephone carrier; and
   E. determining if there are any calls listed in the statement that have not been stored in the telephone.

2. The method claimed in claim 1, wherein the storing step further includes the step of: storing the telephone number called.

3. The method claimed in claim 1, further including the steps of:
   displaying the duration of time of each phone call made by the cellular telephone.

4. The method claimed in claim 1, further including the steps of:
   telephoning a data center that has the statement of the cellular telephone and the authority to resolve disputes between the cellular telephone user and the telephone carrier regarding telephone calls placed by the cellular telephone;
   transmitting the date and time of one or more calls stored in the cellular telephone to the data center;
   comparing the calls listed in the data center statement for a particular telephone with the calls transmitted to the data center from the telephone; and
   settling the charges for telephone calls listed in the statement and not appearing in the cellular telephone.

5. The method claimed in claim 1, wherein the displaying step further includes the step of: viewing the displayed calls one call at a time.

6. The method claimed in claim 1, further including the steps of: storing dollars or call units in the cellular telephone so that the cellular telephone user may only make telephone calls that have a value up to and including the amount of dollars or call units stored.

7. The method claimed in claim 6, further including the steps of:
   displaying the amount of call units or dollars stored in the cellular telephone.

8. The method claimed in claim 6, further including the steps of:
   A. automatically transmitting to the data center the telephone calls made by the cellular telephone; and
   B. advancing the amount of dollars or call units stored in the telephone.

9. The method claimed in claim 8, further including the steps of:
   determining if the cellular telephone is an authorized telephone before performing step A.

10. The method claimed in claim 9, wherein the determining step further including the steps of:
    generating an encrypted number in the cellular telephone that is unique to the cellular telephone;
    transmitting the encrypted number;

receiving the encrypted number generated by the cellular telephone;

generating an encrypted number in a base station that is unique to the cellular telephone communicating with the base station;

comparing the encrypted number generated by the cellular telephone with the encrypted number generated by the base station; and connecting the cellular telephone to a network to complete a call if the encrypted number generated by the cellular telephone is the same as the encrypted number generated by the base station.

11. The method claimed in claim 9, wherein the determining step further including the steps of:

generating a new encrypted number in the cellular telephone after each completed telephone call; and generating a new encrypted number in the base station after each completed telephone call.

12. The method claimed in claim 11, wherein the step of generating a new encrypted number in the cellular telephone further includes the step of:

generating seed numbers.

13. The method claimed in claim 12, wherein the step of generating a new encrypted number in the base station further includes the step of:

generating seed numbers.

* * * * *